United States Patent

[11] 3,624,672

| [72] | Inventor | Paul L. Spivy<br>Bartlesville, Okla. |
|---|---|---|
| [21] | Appl. No. | 736,732 |
| [22] | Filed | June 13, 1968 |
| [45] | Patented | Nov. 30, 1971 |
| [73] | Assignee | Phillips Petroleum Company |

[54] MOLDING OF CELLULAR OBJECTS
9 Claims, 6 Drawing Figs.

[52] U.S. Cl. .................................................. 18/30 LM,
18/5 BB, 18/30 PA, 18/30 PR
[51] Int. Cl. .......................................................... B29f 1/00
[50] Field of Search ............................................. 18/30 O, 20
I, 20 R, 30 LC, 30 LM, 30 PA, 30 LT, 5 BO, 5 BM,
20 B, 30 PR, 5 BP, 5 BE

[56] References Cited
UNITED STATES PATENTS

| 2,858,564 | 11/1958 | Sherman et al. | 18/5 BP X |
| 3,344,471 | 10/1967 | Martelli | 18/5 BP |
| 3,355,763 | 12/1967 | Willert | 18/5 BP |
| 3,496,600 | 2/1970 | Heston | 18/20 B |
| 1,858,956 | 5/1932 | Hepperle | 18/30 O UX |
| 2,951,261 | 9/1960 | Sherman | 18/5 BM |
| 3,179,981 | 4/1965 | Gravesen | 18/30 LT |
| 3,425,092 | 2/1969 | Jun Taga | 18/30 O X |
| 3,501,809 | 3/1970 | Kinsley | 18/20 B |

FOREIGN PATENTS

| 1,763,561 | 1961 | Japan | 18/30 PR |
| 2,383,163 | 1963 | Japan | 18/20 H |

*Primary Examiner*—J. Spencer Overholser
*Assistant Examiner*—Michael O. Sutton
*Attorney*—Young & Quigg ABSTRACT: A molding apparatus which utilizes two-section split molds which are particularly adapted for molding foamable material and are provided with opening devices which automatically remove the top mold section from each mold, then swing it down to the position adjacent the bottom section of each mold. In operation, the mold is closed around elongated extrusion nozzles which are withdrawn as the mold is filled with the expandable thermoplastic material.

INVENTOR.
PAUL L. SPIVY

INVENTOR.
PAUL L. SPIVY
BY Young & Quigg
ATTORNEYS

MOLDING OF CELLULAR OBJECTS

This invention relates to molding. In another aspect, this invention relates to a new and improved molding apparatus particularly suitable for molding cellular structures. In still another aspect, this invention relates to an improved device for opening and closing a two-section mold.

According to a recently disclosed cellular 1-olefin technique, a thermoplastic material such as, for example, a 1-olefin polymer is initially plasticized under heat and pressure. Next, an expanding medium is thoroughly admixed into the plasticized thermoplastic material while the temperature and pressure are maintained such that substantially no cells are formed in the mass. The material is then extruded from a nozzle into a mold, the outer surface of the extrudate becoming sufficiently cooled to form a closed but extensible layer without setting the interior of the mass. Finally, because of the reduced pressure in the mold, the expanding medium causes the extrudate to swell within the extensible layer to thereby conform to the shape of the interior of the mold. This expansion causes cells or voids within the interior of the mass to form. Thus, a relatively low density thermoplastic object will result after the mass is cooled.

If elongated articles are to be produced, the extrusion nozzle may extend into the mold cavity initially and either the nozzle or the mold can be withdrawn progressively as the mold is filled.

One object of this invention is to provide an improved apparatus for molding cellular objects.

Another object of this invention is to provide an improved two-section mold opening and closing apparatus which is particularly adapted for the molding of cellular objects.

According to one embodiment of this invention, an improved apparatus is provided for injection molding, particularly for the molding of cellular objects wherein means are provided for closing a split mold around elongated extrusion nozzles. A programmed mold withdrawal means is also provided for moving the mold away from the outlet of the extrusion nozzle as the mold is being filled.

According to another embodiment of this invention, an improved split mold opening and closing device is provided which is particularly adapted for use on an indexing wheel or turret whereby the top split mold section is removed and withdrawn to a position adjacent the bottom split mold section.

This invention can be more easily understood with reference to the drawings in which.

Figure 4:
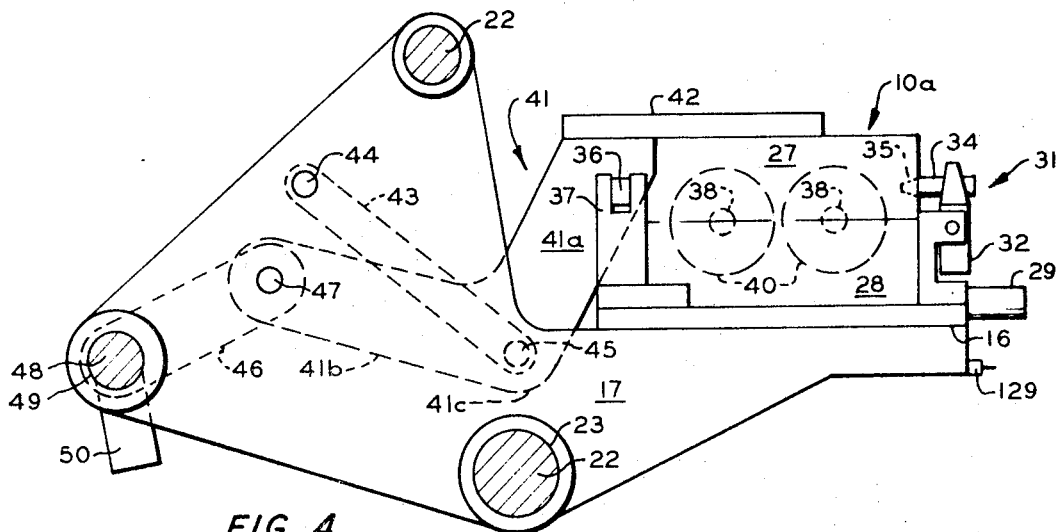
FIG. 4 is a sectional view taken along lines 4—4 of FIG. 1 and illustrates the improved split mold and split mold actuating mechanism of this invention.
Figure 5:
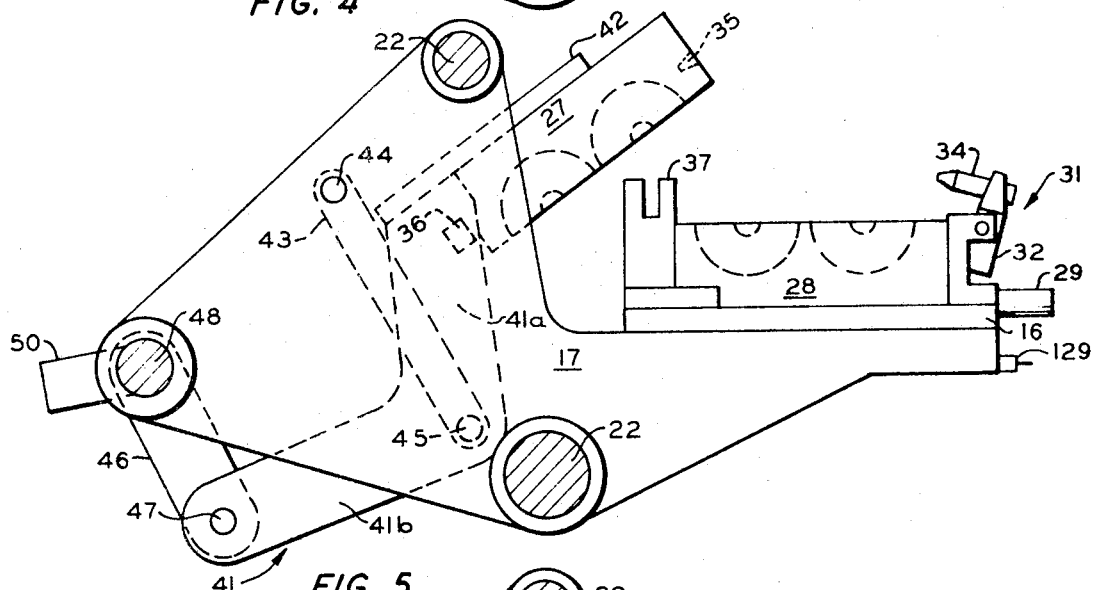
Figure 6:
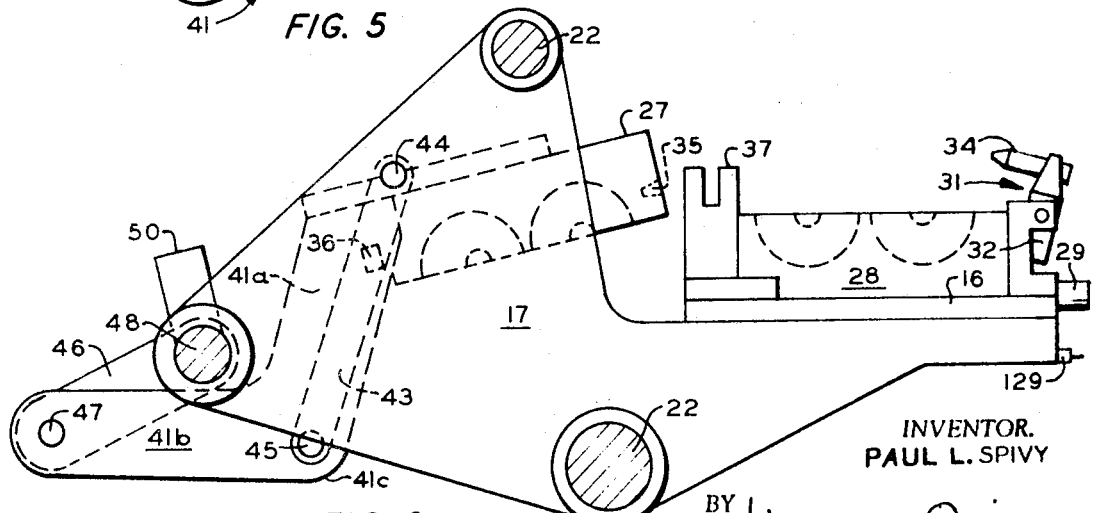

FIGS. 5 and 6 further illustrate the mold of FIG. 4 while being actuated.

Figure 1:
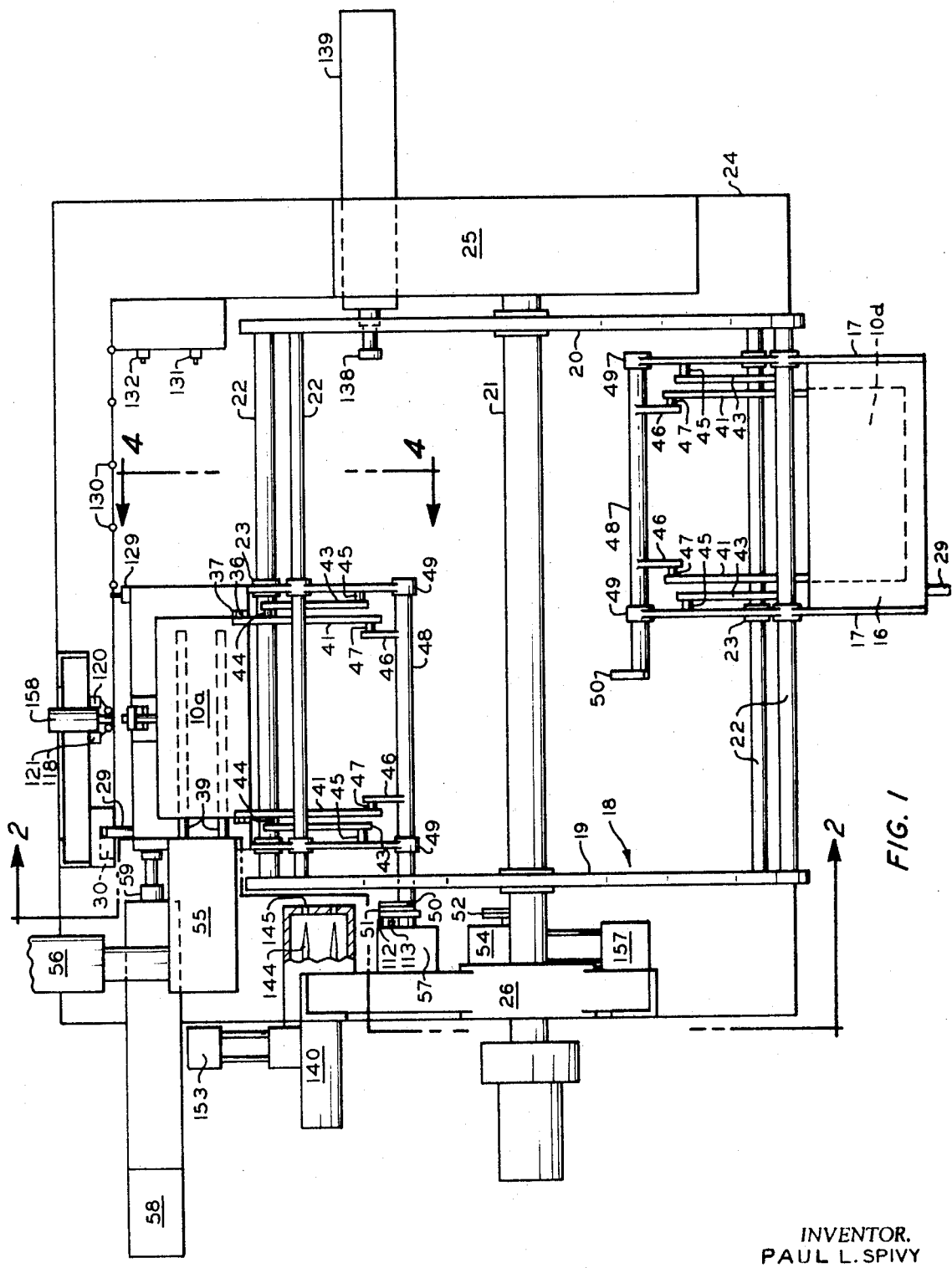
FIG. 1 is a plan view of the molding apparatus of this invention which illustrates the position of only two molds on the indexing wheel.
Figure 2:
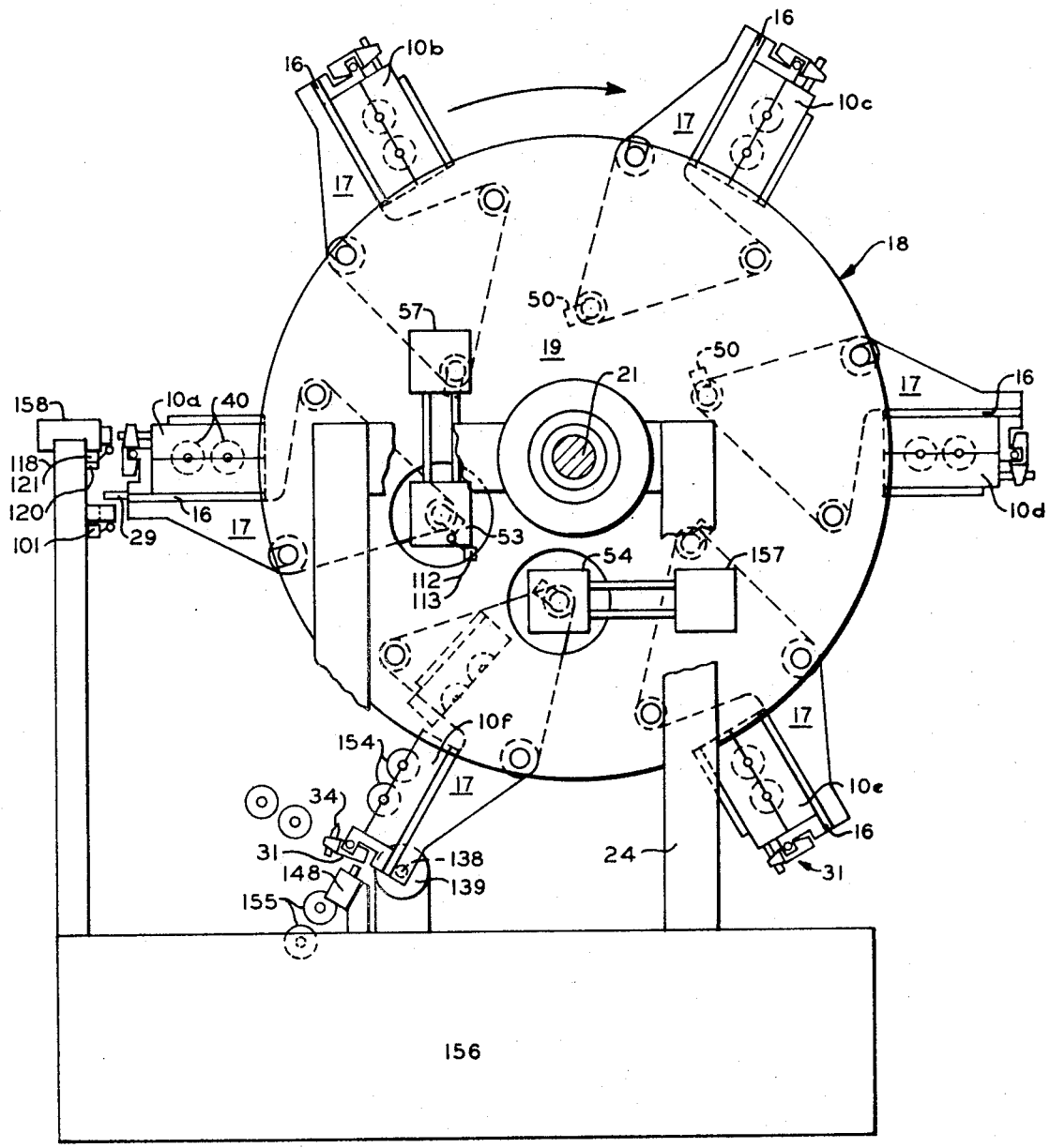
FIG. 2 is a sectional view taken along lines 2—2 of FIG. 1, but illustrating the position of six molds on the indexing wheel.

Now referring to FIGS. 1 and 2, split molds 10a–10f mounted on plates 16 are supported by mold frames 17 on indexing turret 18. Indexing turret 18 comprises wheel members 19 and 20 which are mounted on spindle 21 and spaced by guide rods 22. Frames 17 are slidably mounted on guide rods 22 at points 23. Spindle 21 is mounted on machine frame 24 between indexing mechanism 25 and bearing 26.

The construction of identical split molds 10a–10f is illustrated in FIGS. 1 and 2, and in FIG. 4 with particular reference to mold 10a. In the embodiment illustrated, the internal configuration of the molds conforms to elongated cylindrical objects such as, for example, tool handles. However it is to be understood that the molds of this invention can be used to form articles of various shapes and sizes; therefore, the invention is not limited to the particular internal configuration of the mold cavity, or the number of mold cavities per individual mold.

For example, the mold may contain a series of connected cavities which are filled sequentially. As shown in FIG. 4, mold 10a is formed from two cooperating mold halves 27 and 28. Mold half 28 is affixed to plate 16 and carries latch 31 and lug 29 which cooperate with a camming surface 30 on machine frame 24 to align the mold before it is filled with expandable thermoplastic material. Latch 31 comprises pivot arm 32 and fastening pin 34 which cooperates with indentation 35 in mold section 27. Thus, the end of pin 34 can be disengaged from indentation 35 by applying pressure to the lower portion of pivot arm 32 such as is illustrated in FIGS. 5 and 6. Lugs 36 cooperate with receivers 37 to align mold sections 27 and 28. Apertures 38 which are adapted to receive elongated extrusion nozzles 39 in a slidable relationship communicate through the end wall of mold 10a with mold cavities 40.

The mold opening and closing mechanisms will be described with reference to FIGS. 1, 4, 5, and 6. As illustrated, angled lifting arms 41 are generally "L" shaped members having a first upright leg 41a with its end attached to mold section 27 joined to a second leg 41b to form an apex 41c. Lifting arm 41 can also be in the shape of a semicircular object, a sharply angled "L," or a triangular shaped object, for example. The upper end of legs 41a of angled lifting arms 41 can be attached to mold section 27 in any conventional manner such as, for example, through connecting member 42. Elongated guiding arms 43 are pivotally mounted at one end of frames 17 and at the other end at a point adjacent apexes 41c at pivot points 44 and 45, respectively. The ends of legs 41b of angled lifting arms 41 are pivotally connected to driving rods 46 at pivot points 47. Driving rods 46 are connected to rotatable shafts 48 and extend therefrom in a radial direction. Rotatable shafts 48 are rotatably mounted through frames 17 at points 49. Driving lugs 50 are attached to the ends of rotatable shafts 48 as illustrated, and are adapted to slide within matching slots carried by power members 51 and 52 which, in turn, are driven by rotatable power mechanisms 53 and 54 which are driven by rotary air cylinders 57 and 157, respectively (FIG. 1).

It must be noted that the preferred embodiment illustrated in FIG. 1 utilizes a pair of actuating members comprising elements 41, 43, and 46 positioned adjacent each end of respective mold cavity. However, there need be only one set of said elements to practice this invention, particularly when utilizing smaller molds. When utilizing only one set of the actuating members 41, 43, and 46, it is generally desirable to attach the upper end of leg 41b adjacent the center of the mold top, and to pivotally attach guiding arm 43 to an extension from frame 17. Thus, FIGS. 4 through 6 illustrate the position and action of the mold opening mechanism as driving lug 50 is rotated about 180° in a clockwise direction (as illustrated in FIGS. 4–6). This rotation will cause pivot points 47 and 45 to rotate in an arcual direction toward rotatable shafts 48, thereby causing mold section 27 to initially move upward, and lugs 36 to disengage from receivers 37. As driving lug 50 rotates through about 90°, lifting arm 41 carries mold section 27 downwardly between guide rods 22 (FIG. 5). As driving lug 50 rotates through about 180°, pivot point 47 moves in an arcual direction around driving rod 48, and pivot point 45 moves in a wider arcual direction about pivot point 44 toward rotatable rod 48 to thereby carry mold section 27 to a position between guide rods 22 and adjacent mold section 28, no part of which overlaps mold section 28. Mold 10a is closed by rotating driving lug 50 back through about 180° in a counterclockwise direction (as illustrated in FIGS. 4–6).

Figure 3:
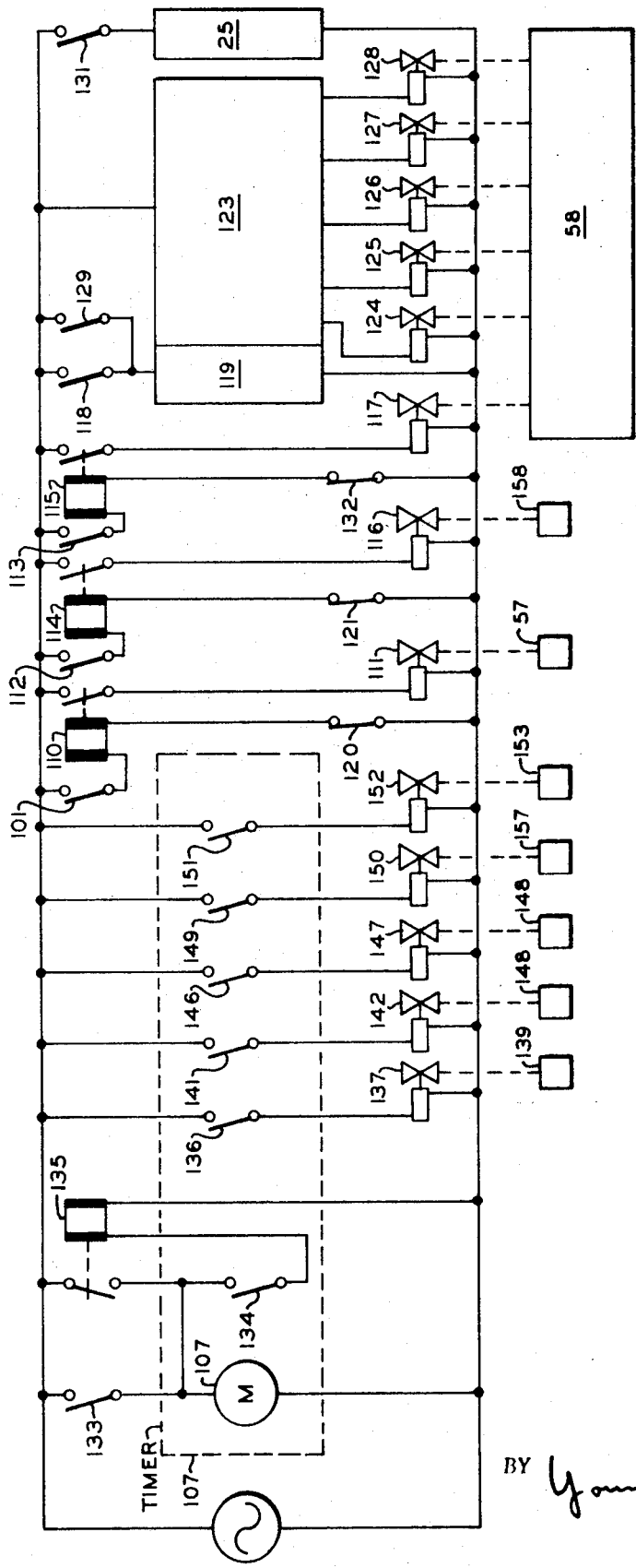
FIG. 3 is a schematic electrical circuit diagram for controlling the apparatus of FIG. 1.

The operation of a complete molding cycle will now be described with reference to FIGS. 1–3. Elongated extrusion nozzles 39 are connected to manifold 55 which in turn receives molten, expandable thermoplastic material from extruder 56 which delivers molten, thermoplastic material at a constant rate. Extruder 56 is preferably the extrusion device illustrated and described in British patent 1,018,178. In its operation, a screw is mounted for continuous rotation within a heated extruder barrel and thoroughly admixes thermoplastic material with a suitable expanding material and then transports the resulting admixture to manifold 55. The interior of the extruder barrel within extruder 56, and the interior of manifold 55 are maintained under sufficient pressure to substantially prevent the cells from forming in the admixture of thermoplastic material and expanding material during the mixing and transporting operation. Examples of suitable thermoplastic materials which can be utilized are polymers and/or copolymers and mixtures of 1-olefins having from two to eight carbon atoms, such as polyethylene, polypropylene, polybutene, and copolymers thereof. Suitable expending materials which can be used include ammonium carbonate and sodium bicarbonate.

Turret 18 is periodically indexed by indexing unit 25. A suitable indexing unit which can be used in the practice of this invention is a "Bellows-Valvair" air-operated 22-inch rotary feed table, Cat. No. B3112–001, available from Bellows-Valvair Div. of IBEC, Akron, Ohio. Between each indexing motion of turret 18, a mold filling operation and a molded object's ejection operation will occur. Switches 101, 112, 113, 118, 129, stepping switch 119, and matrix switch 123 control the mold closing and filling operation; whereas, switches 133 and 134 and timer 107 control the mold opening and molded object's ejection operation. The mold closing and filling operation occurs concurrently with the mold opening and ejection operation, but for convenience, the two operations will be described separately below.

MOLD CLOSING AND FILLING OPERATION

To initiate the indexing of turret 18, switch 131 actuates indexing unit 25 when it is contacted as a mold is moved off extrusion nozzles 39 at the end of a mold filling operation. This indexing motion will cause an open mold such as 10f (FIG. 2) to rotate upwardly to the mold filling station. As this mold is moved upward, it is cammed by the action of cam 30 on lug 29 which aligns the open mold section 28 with elongated extrusion nozzles 39 in a position such that when the mold closes the ends of the extrusion nozzles will be enclosed within the mold.

As the mold comes into filling position driving lug 50 slides within a corresponding groove in driving means 51 of rotating drive member 53 which is energized by rotary air cylinder 57. Also, as the mold comes into this position relative to the extrusion nozzles, it momentarily closes switch 101 to energize relay 110 which, in turn, actuates solenoid valve 111 which supplies air to rotary air cylinder 57. The actuation of rotary air cylinder 57 in turn causes driving means 53 to rotate driving member 51 through about 180° to thereby close the mold. As the mold comes to the closed position, it closes switches 112 and 113 to energize relays 114 and 115, respectively, causing the actuation of solenoid valves 116 and 117, respectively. The actuation of valve 116 energizes air cylinder 158 and causes its piston rod to contact pin 34 and drive it into seating engagement within indentation 35 to thereby lock mold 10a (FIG. 1) in the closed position. This action closes switch 118 thereby actuating stepping switch 119 and opens normally closed switches 120 and 121 thereby deactuating solenoid valves 111 and 116 causing air cylinders 57 and 158 to retract. The actuation of valve 117 supplies air to an air cylinder operated mold velocity programmer 58 which causes piston 59 to contact frame 17 which carries mold 10a and frame 17 in the direction of mold indexer 25 on guide rods 22.

The velocity at which piston 59 moves mold 10a off the elongated extrusion nozzles 39 is controlled by the mold velocity programmer. A suitable mold velocity programmer which can be used for this invention is the Bellows-Valvair in line hydrocheck assembly Model No. DCBM–5C available from Bellows-Valvair Div. of IBEC, Akron, Ohio.

Thus, the velocity of movement of piston rod 59 is varied by throttling hydraulic oil through any combination of precision control valves within the programmer unit. Five precision control valves are illustrated in this embodiment. Likewise, stepping switch 119 is a 5-level stepping switch and is used in combination with matrix switch 123 and thereby determines which combination of valves 124 through 128 will be opened at each step of the stepping switch. A suitable stepping switch which can be used in the practice of this invention is automatic electric-type 45, 25-point stepping switch available from Automatic Electric Company, Northlake, Illinois. A suitable matrix switch which can be used in the practice of this invention is Faurus Matrix Switch 5×20 matrix-two layer, available from Faurus Corporation, Lambertville, N.J. The position of the stepping switch arm advances one position each time switch 129, which moves with the mold, is closed by one of the several pins 130 located on the frame of the machine. When the mold has moved off the lances, it momentarily closes switch 131 to thereby start indexing unit 25, and it momentarily opens switch 132 to deenergize coil 115 which, in turn, deenergizes solenoid valve 117 allowing the programmer air cylinder to retract to its start position ready for the next cycle.

MOLD OPENING AND EJECTION OPERATION

When indexing unit 25 completes its indexing motion, it momentarily closes a limit switch 133 which is located within the indexing unit. This momentary contact starts timer 107 which immediately closes switch 134 which, in turn, energizes relay 135 to the closed position so that the timer continues to run when momentary contact switch 133 is opened. The timer runs until it completes its cycle and opens switch 134 which interrupts energy to relay 135 causing it to open and stop the timer. A suitable timer which can be used in the practice of this invention is an Eagle Multipulse Timer, No. MP9-A6-O1 available from Eagle Signal Division of E. W. Bliss Company, 736 Federal Street, Davenport, Iowa. This timer will control the mold opening and formed object ejection operation. As the timer runs, it closes switch 136 which energizes solenoid valve 137 causing the actuation of piston 138 within air cylinder 139. Piston 138 contacts frame 17 of mold 10f (FIG. 2) and slides the frame back on guide rods 22 to a position adjacent cylinder 140, i.e., the ejection station. Piston 138 will push frame 17 to a position adjacent cylinder 140 which is also a position relative to the end of extrusion nozzles 39 such that any material drooling from the outlet of extrusion nozzles 39 will not fall on this mold or its frame. Thus, the camming motion resulting from the action of cam 30 on lug 29 as the mold is passed upwardly to the mold filling position brings the mold section 28 into a position under the outlet end of extrusion nozzle 39 so that the mold can be immediately closed and the filling started. Next, switch 141 is closed and thereby energizes solenoid valve 142 actuating a needle-carrying piston within cylinder 140 causing the piston to insert ejection needles 144 through apertures 145 which are in registration with nozzle apertures 38 of mold 10f, through nozzle apertures 38, and into the ends of the molded parts within mold 10f. Switch 136 is next opened by the timer thereby deenergizing valve 137 allowing piston 138 to retract within air cylinder 139. Timer 107 next closes switch 146 thereby actuating solenoid valve 147 which supplies air to air cylinder 148 thereby actuating its piston and causing it to contact the lower portion of pivot arm 31 and withdraw pin 34 from locking engagement with indentation 35 thereby unlocking mold cavity 10f Timer 107 next opens switch 146 thereby deenergizing solenoid valve 147 allowing the piston of air cylinder 148 to retract. In the next sequence, timer 107 closes switch 149 thereby actuating solenoid valve 150 which supplies air to cylinder 157. The actuation of cylinder 157 causes driving lug 52 carrying lug 50 within its groove to turn about 180° in a clockwise direction (FIG. 2) causing mold 10f to open.

After mold 10f is opened as illustrated in FIG. 2, timer 107 closes switch 151 which energizes solenoid valve 152 thereby actuating rotary cylinder 153. This actuation of cylinder 153 causes cylinder 140 to rotate about 180° in a counterclockwise direction (FIG. 2) thereby ejecting parts 154 which are impaled on ejection needles 144 by lifting them from the mold and rotating them about 180° to position 155. Timer 107 then opens switch 141 to deenergize solenoid valve 142 and cause the needle-carrying piston within 140 to retract. As needles 144 retract within apertures 145 the formed objects are stripped therefrom and are dropped into collection bin 156. Timer 107 next opens switch 151 to deenergize solenoid valve 152 allowing air cylinder 153 to retract. The timer also opens switch 149 which allows air cylinder 157 to retract and it opens switch 134 to thereby deenergize switch 135 and stop timer 107. Timer 107 will start again at the conclusion of the next indexing motion when switch 133 is momentarily closed.

Although this invention has been described with respect to its preferred embodiments, it should be understood that many variations and modifications will now be obvious to those skilled in the art, and the above-described preferred embodiments are in no way intended to limit the scope of this invention. For example, it is clearly within the scope of this invention to position the extruder adjacent mold 10d as illustrated in FIG. 2. When operating in this manner, mold section 28 of the individual molds will be indexed and cammed to a position over extrusion nozzles 39 and mold section 27 will then move upwardly to enclose the outlet ends of extrusion nozzles within the respective mold cavities.

What is claimed is:

1. A mold apparatus comprising:
   an extruder means;
   elongated extrusion nozzle means connected to said extruder means;
   at least one split mold means having two cooperating mold halves which in the closed position form an internal cavity with a configuration of the object to be molded, each said mold means having an aperture means communicating with its cavity which is adapted to receive said nozzle means, said aperture means positioned through said mold so that it is partially bounded by each of said mold halves;
   mold operating means to open and close said mold means comprising
   a frame means; a rotatable member rotatably positioned through said frame means; a generally L-shaped lifting member having first and second legs joined to form an apex, said first leg attached to the top of said mold in a manner so that said first leg is substantially upright and the outer edge thereof is positioned adjacent said mold when said mold top is positioned on said mold bottom in a closed relationship; an elongated guiding member having its first end pivotally mounted on said frame at a first pivot point and having its second end pivotally mounted adjacent the apex of said generally L-shaped member at a second pivot point to guide said apex in a first arcual motion away from said mold and toward said rotating member; and a driving rod member attached to said rotatable member and extending therefrom in a radial direction to the rotation thereof, said driving rod member pivotally attached to the end of said second leg of said generally L-shaped member at a third pivot point in a manner to thereby carry the end of said second leg in a second arcual motion away from said mold and around said rotating member so that a partial rotation of said rotating member will cause said second and third pivot points to move through said first and second arcual motions respectively and thereby cause the top of said mold to lift upwardly and become positioned at a point adjacent the bottom of said mold; and
   positioning and actuating means cooperating with said mold-operating means to align said mold in open position adjacent said extrusion nozzle means and to actuate said mold-operating means to thereby enclose the outlet end of said extrusion nozzle means within said cavity leaving said extrusion nozzle means extending through said aperture.

2. The apparatus of claim 1 further comprising means to withdraw said mold from said extrusion nozzle means as said mold is being filled.

3. The apparatus of claim 1 wherein said positioning means comprises a turret, and said turret having a plurality of said molds equally spaced adjacent its periphery.

4. The apparatus of claim 3 wherein said turret comprises two circular members positioned on a spindle and spaced thereon by spacing rod means.

5. The apparatus of claim 4 wherein said mold means are slidably mounted on said spacing rod means, and means are provided to slide each mold along said spacing rod means adjacent said nozzle means as said mold is indexed.

6. The apparatus of claim 1 wherein said positioning and actuating means comprises a first actuating means positioned adjacent said nozzle means to rotate said rotatable member in a first direction thereby causing said mold to close, and a second actuating means in spaced relationship with said nozzle means to rotate said rotatable member in a second direction and open said mold after said mold is filled.

7. The apparatus of claim 6 further comprising a molded object ejection means positioned adjacent said second actuating means.

8. The apparatus of claim 7 wherein said molded object's ejection means comprises ejection needle means positioned to pass through said aperture and be forced into the molded object within the mold, and means to move said ejection needle having a formed object impaled thereon in a direction from said mold after said mold is opened.

9. A mold opening apparatus for removing a top movable section from a bottom stationary section of a split mold comprising:
   a frame means;
   a rotatable member rotatably positioned through said frame means;
   a generally L-shaped lifting member having first and second legs joined to form an apex, said first leg attached to the top of said mold in a manner so that said first leg is substantially upright and the outer edge thereof is positioned adjacent said mold when said mold top is positioned on said mold bottom in a closed relationship;
   an elongated guiding member having its first end pivotally mounted on said frame at a first pivot point and having its second end pivotally mounted adjacent the apex of said generally L-shaped member at a second pivot point to guide said apex in a first arcual motion away from said mold and toward said rotating member;
   a driving rod member attached to said rotatable member and extending therefrom in a radial direction to the rotation thereof, said driving rod member pivotally attached to the end of said second leg of said generally L-shaped member at a third pivot point in a manner to thereby carry the end of said second leg in a second arcual motion away from said mold and around said rotatable member so that a partial rotation of said rotating member will cause said second and third pivot points to move through said first and second arcual motions respectively and thereby cause the top of said mold to lift upwardly and become positioned at point adjacent the bottom of said mold.

* * * * *